(12) United States Patent
Gates et al.

(10) Patent No.: US 8,221,617 B1
(45) Date of Patent: Jul. 17, 2012

(54) HOT WATER RECOVERY APPARATUS FOR RECLAIMING PROCESS WATER

(75) Inventors: Danny E. Gates, Wichta, KS (US);
James E. Loewen, Wichita, KS (US);
Aron T. Wilde, Dallas, GA (US)

(73) Assignee: American Water Purification, Inc., Wichita, KS (US)

( * ) Notice: Subject to any disclaimer, the term of this patent is extended or adjusted under 35 U.S.C. 154(b) by 422 days.

(21) Appl. No.: 12/592,501

(22) Filed: Nov. 25, 2009

Related U.S. Application Data

(60) Provisional application No. 61/200,175, filed on Nov. 25, 2008.

(51) Int. Cl.
*B01D 63/06* (2006.01)

(52) U.S. Cl. .......... 210/97; 210/103; 210/108; 210/134; 210/143; 210/149; 210/257.1; 210/321.65; 210/416.1; 210/418; 210/427; 210/433.1

(58) Field of Classification Search ............ 210/97, 210/103, 108, 134, 143, 149, 257.1, 321.65, 210/416.1, 418, 427, 433.1
See application file for complete search history.

(56) References Cited

U.S. PATENT DOCUMENTS

| | | | |
|---|---|---|---|
| 5,173,190 A * | 12/1992 | Picek | 210/651 |
| 6,503,401 B1 * | 1/2003 | Willis | 210/748.11 |
| 2007/0082594 A1 * | 4/2007 | Caracciolo, Jr. | 452/81 |
| 2007/0084802 A1 * | 4/2007 | Hilgren et al. | 210/764 |

* cited by examiner

*Primary Examiner* — Nam Nguyen
*Assistant Examiner* — Paul J Durand

(57) ABSTRACT

An apparatus for reclaiming hot process water from a animal processing facility includes a screen portion, a filtration portion and optionally a UV sterilization portion. The screen portion receives dirty hot process water and removes macroscopic debris to produce raw tank water. Raw tank water is pumped through the filtration portion at relatively high pressure in order to remove substantially all solids to produce a permeate side stream. The permeate is optionally passed through a very intense ultra-violet field in order to produce uncontaminated reclaimed hot process water which may be safely reintroduced as hot scald water for the poultry cleaning process.

10 Claims, 1 Drawing Sheet

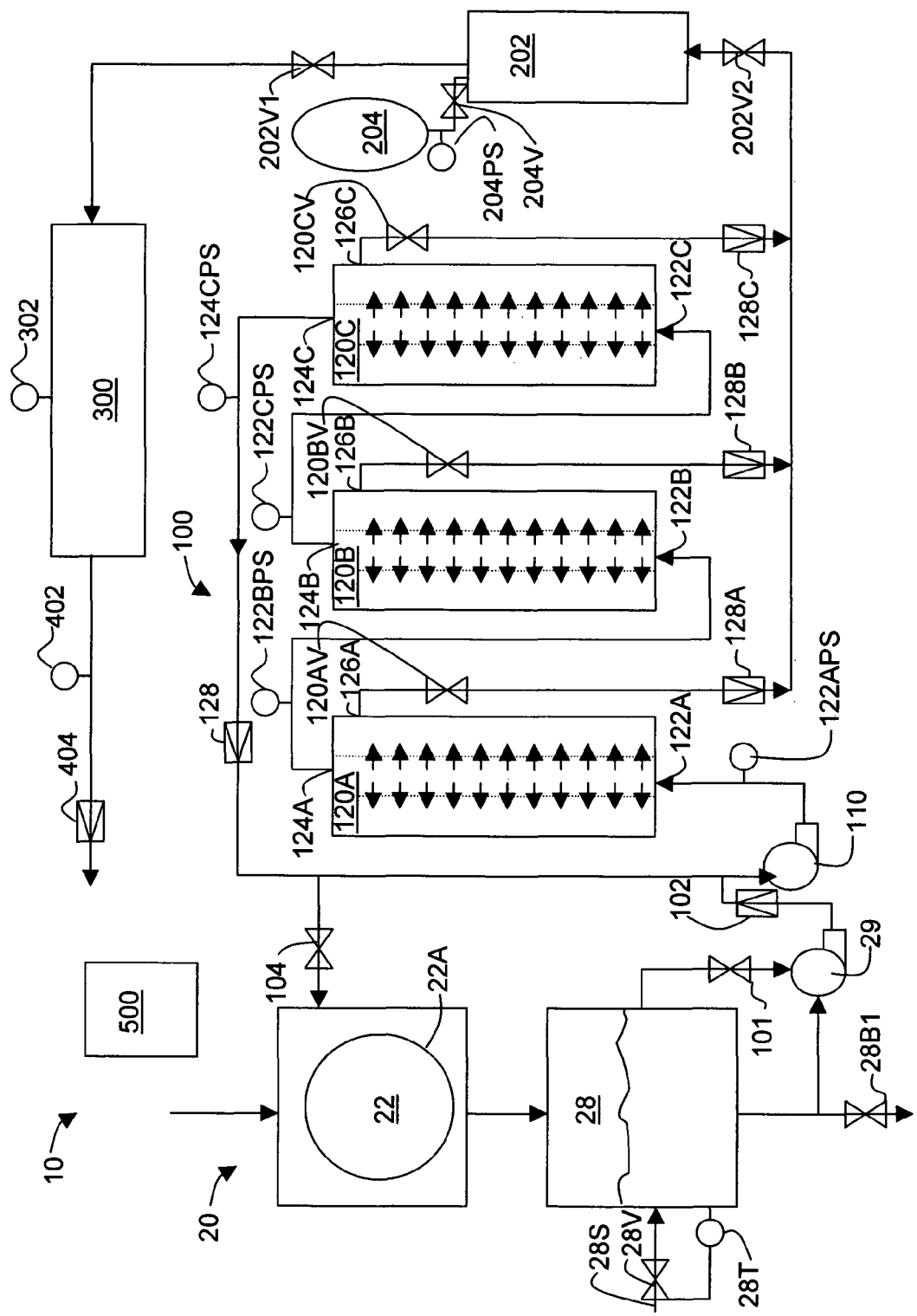

HOT WATER RECOVERY APPARATUS FOR RECLAIMING PROCESS WATER

FIELD OF THE INVENTION

This application claims the benefit of provisional U.S. patent application Ser. No. 61/200,175 filed on Nov. 25, 2008 which is incorporated herein by reference.

FIELD OF THE INVENTION

This invention relates to an apparatus and method for cleaning and reclaiming contaminated water from an animal processing facility.

BACKGROUND OF THE INVENTION

Hot water or "scald water" is used in poultry processing facilities to remove feathers and to clean poultry in an initial stage of poultry processing. Typically, an overflow of wastewater from such a process is highly contaminated and is discharged to a Dissolved Air Flotation System (DAF) and then further released to a municipal wastewater treatment facility. In so doing, the water is lost and the energy input to heat the process water is lost, resulting in significant water costs, discharge costs, treatment costs and energy costs for the facility. What is needed is a means for cleaning and reclaiming process water in order to reclaim most of the heat invested in the process water and much of the water itself in order to reduce energy and resource costs.

BRIEF DESCRIPTION

The above-described need is addressed by an apparatus for reclaiming hot process water from an animal processing facility. The apparatus includes a screening and settling portion, a filtration portion and may optionally include a UV sterilization portion. The screening and settling portion receives raw process water and removes macroscopic debris to produce tank water. Tank water is pumped through the filtration portion at relatively high pressure in order to remove substantially all solids to produce a permeate. The filtration portion features ceramic filter units which each have a multitude of small diameter channels extending between a filter unit inlet and a filter unit discharge. Most of the tank water flows from the inlet to the discharge of the filter unit while only some of the tank water is filtered as it permeates the walls of the channels and is collected as permeate. The unfiltered tank water collected at the discharge is recycled back through the filtration portion. The permeate collected from the filter units and may be passed through a very intense ultra-violet field in order to produce uncontaminated reclaimed hot process water which may be safely re-introduced as hot process water for the poultry cleaning process.

BRIEF DESCRIPTION OF THE DRAWINGS

FIG. 1 is a schematic diagram of the hot water recovery apparatus of the present invention.

DETAILED DESCRIPTION

As noted above, the initial stages of poultry processing employs a continuous flow of hot (i.e. generally between 120 to 160 degree F. and preferably 140 degree F) water. This hot water is known as "scald water" in a poultry processing facility and is used to clean poultry carcasses and becomes heavily contaminated with animal waste by-products, including feathers, blood, high concentrations of numerous types of pathogens and other biological waste during the initial carcass cleaning process. Hereinafter, "scald water" will be referred to with the more general term of "process water". As noted above, the prior art process has been to release this highly contaminated hot process water into a waste water treatment process where the heat energy invested in the process water and the water itself is lost. The purpose of process water cleaning apparatus 10 is to clean and reclaim this hot process water while retaining the previously invested heat energy. Preferably, process water cleaning apparatus 10 is contained in a transportable unit which can be turn key installed at a animal processing facility. Preferably, process water cleaning apparatus 10 is self contained and includes a control unit which may communicate via the interne so that a remote technician can monitor its operation as will be described in greater detail below.

Referring to the drawings, FIG. 1 provides a schematic diagram of the process water cleaning apparatus 10 of the present invention. The apparatus generally includes, a screening and settling portion 20, a ceramic filter portion 100, an ultra-violet sterilization portion 300 and a control module 500. It is preferable that process water cleaning apparatus 10 be skid mounted in an envelope which is transportable in a trailer of a type such as a standard over the road tractor-trailer unit. Also preferably, control module 500 is accessible via the interne so that monitoring and control of process water cleaning apparatus 10 may be conducted at a remote location. Accordingly, process water cleaning apparatus 10 can be built, transported and then integrated into an existing poultry processing facility often by placement of the unit on the roof of a poultry processing facility and monitored and operated from a remote location.

Hot dirty process water is received from a poultry carcass cleaning process and pumped to screening and settling portion 20 which includes a screen drum unit 22 and a settling tank 28. In this example, screen drum unit 22 includes a cylindrical screen 22A having mesh size of approximately 100 microns and preferably a mesh size generally between 50 and 150 microns. The effluent from rotating screen drum unit 22 may be identified as screened process water. The screened process water is conveyed to settling tank 28. Solid materials precipitate out of the screened process water entering settling tank 28 and settle to the bottom of settling tank 28 and are periodically discharged through sediment discharge valve 28B1. Accordingly, the effluent of settling tank 28 does not have the same make up as the screened process water leaving rotating screen drum unit 22 and thus will be referred to below as tank water. Settling tank 28 is connected to a supply of steam 28S which is introduced into settling tank 28 in order to maintain the temperature of tank water in tank 28 preferably between 130 degrees F. and 150 degrees F. and preferably as close to 140 degrees F. as possible. The applicants have found 140 degrees F. to be the optimum temperature for conducting the cleaning process. A temperature sensor 28T is connected to a control valve 28V which releases steam into tank 28 as needed to maintain the desired temperature in tank 28. Tank water from settling tank 28 is supplied to ceramic filter portion 100 by supply pump 29.

The next portion of process water cleaning apparatus 10 is a filter portion 100. The flow of tank water into filter portion 100 is powered by supply pump 29, controlled by control valve 101 and measured by a first flow transmitter 102. Supply pump 29, control valve 101 and flow transmitter 102 communicate with control unit 500. Filter portion 100, in this example, also includes a re-circulation pump 110 and a set of ceramic filter units 120A, 120B and 120C.

Each filter unit consists generally of a pattern of ceramic walled channels extending from a tank water intake to a tank water discharge. These channels are of small diameter typically on the order of 1.5 millimeters in diameter. In this example, in the context of cleaning process water in a poultry processing environment, filter units 120A, 120B and 120C, preferably have a pore size of 0.2 microns but may have another pore size depending on the application. The applicants have found a pore size of 0.2 microns is an optimal choice when compared to other available ceramic filters having other pore sizes. The applicant's experience is that pores of 0.2 microns, in the context of this example, produce the most permeate with the best run times between purges. Ceramic filter unit 120A includes a tank water intake 122A and a tank water discharge 124A. Accordingly, ceramic filter units 120B and 120C also have tank water intakes 122B and 122C and tank water discharges 124B and 124C respectively. Ceramic filter units 120A, 120B and 120C are arranged in series so that tank water discharge 124A communicates with tank water intake 122B and so on. Tank water discharge 124C communicates with recycle pump 110. The flow rate of tank water discharged at discharge 124C is measured by flow meter 128. Ceramic filter units 120A, 120B and 120C also have permeate discharges 126A, 126B and 126C respectively.

As noted above the channels of the ceramic filters of each filter unit have a small diameter on the order of 1.5 millimeters. Most of the flow of tank water through each filter unit merely passes from the tank water intake to tank water discharge through the interiors of the longitudinal ceramic walled channels. On the other side of the porous walls of the ceramic channels of the filter units are spaces which communicate with the permeate discharge of each filter unit. The walls of the ceramic channels are fashioned from ceramic membrane material having fine pores which in this example, as noted above, have a nominal opening size of generally 0.2 microns.

By way of example, 350 gallons per minute of tank water may be fed into first ceramic filter unit 120A while approximately 20 gallons per minute of finely filtered permeate may discharge through permeate discharge 126A of ceramic filter unit 120A. Therefore, in this example, approximately 330 gallons of tank water per minute would flow into second ceramic filter unit 120B. Again, by way of example, in filter unit 120B, 20 gallons per minute of permeate might also discharge from that unit and so on until approximately 290 gallons per minute of tank water leaves third ceramic filter unit 120C as another 20 gallons per minute of permeate leaves third ceramic filter unit 120C. Accordingly, in this example, the amount of tank water which would need to be supplied by supply pump 29, to make up for the flow of permeate from the three filter units, would be 60 gallons per minute. Still further, the expected pressure drop between the tank water intake and the tank water discharge of each filter unit is expected to be about 20 PSI. The pressure drop between the tank water intake and the tank water discharge will increase above an acceptable limit when the walls of the small diameter ceramic filter channels are obstructed with filtrate material. This pressure drop increase is one indicator that a purge cycle is needed. Also in this example, another indicator that a purge cycle is needed occurs when the flow of permeate out of a filter unit falls substantially below 20 gallons per minute.

The performance of ceramic filter units 120A, 120B and 120C is continuously monitored by an array of flow meters and pressure sensors which are in communication with control unit 500. The flow meters, pressure sensors, pumps and valves described and shown herein are all preferably in communication with control unit 500 either by signal carrying wires or wirelessly. Preferably control unit 500 is linked to the internet so that a remote technician may access control unit 500 via the internet in a web page format and view the parameters relating to the performance of the system.

Permeate discharge flow meters 128A, 128B and 128C are located at the permeate discharges 126A, 126B and 126C of ceramic filter units 120A, 120B and 120C respectively. Pressure sensor 122APS is located upstream of the intake of filter unit 120A. Pressure sensor 122BPS is located between filter units 120A and 120B. Pressure sensor 122CPS is located between filter units 120B and 120C. And, pressure sensor 124CPS is located downstream of the discharge of filter unit 120C. The data taken from permeate discharge flow meters 128A, 128B and 128C and pressure sensors 122APS, 122BPS and 124CPS are used to monitor the performance of the filter units as will be described in greater detail below.

The finely filtered permeate leaving permeate discharges 126A, 126B and 126C is conveyed to purge tank 202. The permeate flow from each of these filter units 120A, 120B and 120C is an intermediate product of this process. The permeate flow is very finely filtered and continues to retain the relatively high temperature of the initial tank water stream. Downstream of permeate discharges 126A, 126B and 126C are valves 120AV, 120BV and 120CV which are, like all of the valves shown in FIG. 1, controlled by control unit 500. Any combination of valves 120AV, 120BV and 120CV may be closed in order to take its corresponding filter unit off line. So, for example, when valve 120AV is closed, filter unit 120A becomes a pass through unit which produced no permeate. All of the tank water entering at intake 122A merely passes to discharge 124A. A malfunctioning filter unit may be taken off line while the remainder of the system continues to operate.

Periodically, the ceramic membranes of filter units 120A, 120B and 120C will become obstructed with fat, dirt and other contaminants such that the permeate discharge rate through permeate discharges 126A, 126B and 126C as measured by flow meters 128A, 128B and 128C fall below a pre-selected minimum acceptable value. Moreover, the presence of fat, dirt and other contaminants on the inside walls of the small diameter ceramic channels of filter units 120A, 120B and 120C will also obstruct the channels connecting between the intakes and the discharges of the filter units causing the pressure drop between the tank water inlet and the tank water discharge of each filter unit to increase above an acceptable level. In this example, when this pressure drop increases significantly above 20 psi, the control system initiates a high pressure reverse flow purge cycle which flushes highly filtered water at high pressure from a purge tank 202 back across the walls of the ceramic channels in ceramic filter units 120A, 120B and 120C. In the alternative, or additionally, a reduction of measured permeate flow as indicated by flow meters 128A, 128B and 128C may also be used as a primary or secondary indicator for initiating a purge cycle.

The pressurized air for driving the purge cycle is supplied by a compressor tank 204 which is essentially a pressurized tank for storing high pressure air. A pressure sensor 204PS senses the internal pressure of compressor tank 204 for control unit 500, and when valve 204V is open, senses the pressure in compressor tank 204 and purge tank 202. Generally, the purge cycle is initiated by the control unit by shutting down normal operations, pressurizing purge tank 202 and by causing pressurized clean permeate to flow back through the filter units. Control unit 500 can initiate a purge cycle when sufficient pressure is present in compressor tank 204. The purge cycle begins by closing valve 101 and opening valve 104. This shuts off the flow of tank water into the system and decreases the pressure in the tank water sides of the filter units. At the same time, control unit 500 closes valves 202V1 and 202V2 which isolates purge tank 202 and then opens valve 204 which causes the pressure in purge tank 202 to increase as it reaches equilibrium with compressor tank 204. After pressure sensor 204PS indicates that equilibrium has been reached, control unit 500 closes valve 204V to isolate compressor tank 204 from the system and open valve 202V2 to allow pressurized clean permeate to flow back through the filter units causing the materials clogging the filter units to be purged into the stream on the tank water side of the filter units. Because valve 104 is open and valve 101 is closed, purged material and the permeate flow to valve 104 and flow into screen drum unit 22. Once the purge cycle is completed, filter units 120A, 120B and 120C may be returned to normal operation, wherein valve 101 is open, valve 204V is closed, valves 202V1 and 202V2 are open and valve 104 is mostly closed. (Valve 104 is controlled by control unit 500 and may at times be partially open during normal operation to control pressure in the system.) Still further, during a purge cycle, it is possible to close one or more of valves 120AV, 120BV and 120CV in order to selectively purge one or more of filter units 120A, 120B, or 120C.

Tank water discharging from filter unit 120C, in this example, comprises approximately 80% or 290 gallons per minute of the initial flow of approximately 350 gallons per minute entering filter unit 120A. Under normal operating conditions, the tank water discharged from filter unit 120C is returned to re-circulation pump 110. Accordingly, in this example, the input from supply pump 29 may be approximately 60 gallons per minute. Thus, what is described above is a system which has a capacity of producing about 60 gallons of permeate per minute and therefore can accept and clean about 60 gallons of dirty process water per minute. As noted above, permeate from ceramic filter units 120A, 120B and 120C collects in purge tank 202.

In this example process water cleaning apparatus includes an ultra-violet sterilization unit 300 which further sterilizes permeate from purge tank 202. An optional ultra-violet sterilization unit 300 receives permeate from purge tank 202 and subjects it to extremely intense ultra-violet light. A UV sensor 302 is located on ultra-violet sterilization unit 300 and is monitored by control unit 500. UV sensor 302 provides a signal representing the amount of UV light in the water. Load monitors on each of the UV lights provide verification that the system is operating properly. Control unit 500 will alarm if the UV levels drop below a predetermined level or if the system is not fully operational. Subjecting the cleaned process water to intense UV light destroys substantially all of the remaining pathogens which may be present in the water. Other methods such as ultra-sonic pathogenic disruption device may be employed to destroy pathogens still present in the permeate. After leaving ultra-violet sterilization unit 300, the hot cleaned process water passes through a delivery temperature sensor 402 and a delivery flow meter 404. The hot, clean permeate leaving process water cleaning apparatus 10 is returned to the poultry processing facility and is used as clean hot scald water. In this example, the hot, clean reclaimed scald water, during normal operating conditions, is returned at a flow rate which is generally equivalent to the flow rate of hot dirty process water entering process water cleaning apparatus 10. The applicant's have found in initial tests that with an extremely contaminated hot dirty process water input having Heterotropic Plate Count (HPC) pathogen levels raging between 3 to 4 million the output of the system may have an HPC level generally below 500.

It is to be understood that while certain forms of this invention have been illustrated and described, it is not limited thereto, except in so far as such limitations are included in the following claims and allowable equivalents thereof.

The invention claimed is:

1. A modular transportable unit for cleaning hot process water, the unit comprising:
    (a) a screening tank adapted to receive a flow of hot dirty process water from an animal processing facility of the type containing contaminates selected from the following group; (i) macroscopic solids, (ii) particulate matter, (iii) pathogens, (iv) animal waste and (v) animal blood, the screening tank including a screen for removing macroscopic solids to produce screened tank water,
    (b) a settling tank for receiving screened tank water having an outlet which is positioned above the bottom of the settling tank so that solids may settle to the bottom of the settling tank, the water leaving the settling tank being tank water,
    (c) a means for controlling the temperature of the tank water,
    (d) at least a recycle pump communicating with the outlet of the settling tank which receives tank water and pumps the tank water out through a pump discharge at an elevated pressure,
    (e) at least one ceramic filter unit containing a multitude of ceramic channels having porous walls, the at least one filter unit having an intake which is in communication with the discharge of the recycle pump and a discharge which is in at least indirect communication with the intake of the recycle pump, the at least one ceramic filter unit having collection channels on the other side of the porous walls for collecting permeate and a permeate discharge for discharging filtered permeate from the ceramic filter unit,
    (f) a purge tank in communication with the permeate discharge of the at least one ceramic filter unit for receiving filtered permeate,
    (g) a means for returning the filtered permeate from the purge tank to the animal processing facility for reuse as clean hot process water,
    (h) a purging means for forcing permeate from the purge tank to flow into the permeate discharge of the at least one filter unit in order to flow into the ceramic channels of the at least one ceramic filter unit, whereby contaminates obstructing the ceramic channels of the at least one ceramic filter unit are purged into the discharge of the at least one ceramic filter unit.

2. The unit of claim 1, wherein;
    the means for purging permeate from the purge tank to flow into the permeate discharge of the at least one ceramic filter unit is a pressurized tank in communication with the purge tank and a valve interposed between the pressurized tank and the purge tank and a valve for closing the discharge of the purge tank so that when the valve between the pressurized tank and the purge tank is opened and the valve for closing the discharge of the purge tank is closed, permeate in the purge tank is forced into the permeate discharge of the at least one ceramic filter unit in order to purge the ceramic filter unit of contaminates which are obstructing the ceramic filter unit.

3. The unit of claim 1, further comprising;
    a first pressure sensor located upstream of the intake of the at least one ceramic filter unit and a second pressure sensor located downstream of the discharge of the at least one ceramic filter unit, a control unit for monitoring the first and second pressure sensors, the control unit adapted to activate the purging means when the difference between the pressures measured by the first and second pressure sensors falls below a predetermined level.

4. The unit of claim 1, further comprising;

a first pressure sensor located upstream of the intake of the at least one ceramic filter unit and a second pressure sensor located downstream of the discharge of the at least one ceramic filter unit, a control unit for monitoring the first and second pressure sensors, the control unit adapted to activate the purging means when the difference between the pressures measured by the first and second pressure sensors falls below a predetermined level, the control unit also connected to an electronic communication network for access by a remote operator for remotely viewing the performance and status of the unit.

5. The unit of claim 1, further comprising;

a flow rate sensor for measuring the permeate discharged from the at least one ceramic filter unit, a control unit for monitoring flow rate of the permeate discharged from the at least one ceramic filter unit, the control unit adapted to activate the purging means when the flow rate of the permeate discharged from the at least one ceramic filter unit falls below a predetermined level.

6. The unit of claim 1, further comprising;

a flow rate sensor for measuring the permeate discharged from the at least one ceramic filter unit, a control unit for monitoring flow rate of the permeate discharged from the at least one ceramic filter unit, the control unit adapted to activate the purging means when the flow rate of the permeate discharged from the at least one ceramic filter unit falls below a predetermined level, the control unit also connected to an electronic communication network for access by a remote operator for remotely viewing the performance and status of the unit.

7. The unit of claim 1, further comprising;

an ultra-violet sterilization unit which receives permeate from the purge tank and subjects the permeate with intense ultra-violet light in order to kill pathogens present in the permeate prior to returning the permeate to the animal processing facility.

8. The unit of claim 1, further comprising;

a control unit for monitoring the performance of the unit.

9. The unit of claim 1, further comprising;

a control unit for monitoring the performance of the unit which is in communication with an electronic communications network whereby a remote operator may access the control unit and monitor the performance of the unit.

10. The unit of claim 1, wherein;

the unit is configured to be transportable on a standard tractor trailer for over the road transport.

* * * * *